(12) United States Patent
Beyda et al.

(10) Patent No.: US 7,106,737 B1
(45) Date of Patent: Sep. 12, 2006

(54) SYSTEM AND METHOD FOR REINTERPRETING TOS BITS

(75) Inventors: William J. Beyda, Cupertino, CA (US); Rudolf Bitzinger, Santa Clara, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/545,769

(22) Filed: Apr. 10, 2000

(51) Int. Cl.
*H04L 12/28* (2006.01)

(52) U.S. Cl. ............ 370/392; 370/395.43; 370/395.52; 370/395.21; 370/469

(58) Field of Classification Search ................ 370/230, 370/235, 252, 392, 395.31, 395.42, 396.43, 370/395.52, 395.6, 395.61, 395.65, 465, 370/468, 395.21, 401, 402, 231, 352, 469; 709/223, 227, 228, 232

See application file for complete search history.

(56) References Cited

U.S. PATENT DOCUMENTS

| | | | |
|---|---|---|---|
| 6,009,097 A | 12/1999 | Han | 370/395 |
| 6,018,360 A | 1/2000 | Stewart et al. | 348/15 |
| 6,021,263 A | 2/2000 | Kujoory et al. | 395/200.62 |
| 6,028,842 A * | 2/2000 | Chapman et al. | 370/235 |
| 6,363,053 B1 * | 3/2002 | Schuster et al. | 370/230 |
| 6,539,030 B1 * | 3/2003 | Bender et al. | 370/469 |
| 6,567,408 B1 * | 5/2003 | Li et al. | 370/395.31 |
| 6,577,642 B1 * | 6/2003 | Fijolek et al. | 370/465 |
| 6,643,259 B1 * | 11/2003 | Borella et al. | 370/231 |
| 2002/0099854 A1 * | 7/2002 | Jorgensen | 709/249 |
| 2003/0039210 A1 * | 2/2003 | Jin et al. | 370/229 |

FOREIGN PATENT DOCUMENTS

| | | |
|---|---|---|
| WO | WO 99/27684 | 6/1999 |
| WO | WO 99/53648 | 10/1999 |

OTHER PUBLICATIONS

J. Caruso, "QoS Enters Ethernet Realm" InternetWeek, Jan. 26, 1998.
No author "Path 1 Real-Time Ethernet: Provision of QoS Guarantees on Ethernet Legacy LANs" Path 1 Network Technologies Inc. (1999).
G. Prodan "Next-Generation LAN Switches: Ethernet's Answer to ATM's QoS" Telecommunications Online, Sep. 1997.
L. David Passmore "Quality of Service in the LAN" Business Communications Review, Jun. 1999.
F. Desloges "Microphone, Camera, Action! IP Video Conferencing Meets the Desktop" Technology Marketing Corp., Jun. 1999.
J. Duffy "3Com to span Ethernet, ATMnets with QoS" Network World, Apr. 12, 1999.
Sen, et al., "A QoS Management Framework for 3G Wireless Networks," Wireless Communications and Networking Conference, 1999, IEEE, Sep. 21, 1999, pp. 1273-1277. XP010353695.
Adiseshu, et al., "A State Management Protocol for IntServ, DiffServ and Label Switching," Network Protocols, 1998, Sixth International Conference, Oct. 13, 1998, pp. 272-281,. XP010309358.

\* cited by examiner

*Primary Examiner*—Seema S. Rao
*Assistant Examiner*—Shick Hom

(57) ABSTRACT

A system and method for providing Quality of Service in an Ethernet network. One or more telephony application programs are provided, along with an H.323 Recommendation stack, an IP layer, and modular Generate QoSEthernet and QoSEthernet layers. The Generate QoSEthernet layer is adapted to read Type of Service or Differentiated Service bytes and generate desired QoSEthernet commands therefrom. Either the Generate QoSEthernet layer or the QoSEthernet layer may be replaced or modified without necessarily having to modify the H.323 Recommendation stack and application program(s).

11 Claims, 4 Drawing Sheets

SYSTEM AND METHOD FOR REINTERPRETING TOS BITS

BACKGROUND OF THE INVENTION

1. Field of the Invention

The present invention relates to communications systems and, in particular, to an improved system for providing quality-of-service (QoS) in a Voice over IP (VoIP) system.

2. Description of the Related Art

The Internet Protocol (IP) is one of the most popular packet communication and networking protocols being used today. It finds use both on the Internet and in wide area networks (WANs) and local area networks (LANs), such as asynchronous transfer mode (ATM) and Ethernet networks. The promise of inexpensive voice telephony using the Internet has led to extensive interest in "Voice over IP" (VoIP) and "Telephony over LAN" (ToL) applications. In particular, several IP telephony protocols have been developed, including the H.323 Recommendation suite of protocols promulgated by the International Telecommunications Union (ITU), the Session Initiation Protocol (SIP), and Media Gateway Control Protocol (MGCP), to name a few.

For example, FIG. 1A illustrates a protocol stack 100a for a conventional H.323 implementation over an Ethernet IP network. One or more application programs 103a interface to the protocol stack 100a. The H.323 layer 101a includes a control layer 106 supporting H.245 control signaling for negotiation of media channel usage, Q.931 (H.225.0) for call signaling and call setup, and H.225.0 Registration, Admission and Status (RAS). The H.323 layer 101a may also include a data layer 108 supporting T.120 for data conferencing. The H.323 layer 101a further implements audio codecs 102 and may also implement video codecs 104. An RTP/RTCP layer 110 is provided for sequencing the audio and video packets. The H.323 layer 101a employs UDP and TCP 112 as its transport layer, and also employs an IP layer 114, and then, an Ethernet layer 116. Further details concerning the H.323 Recommendation may be obtained from the International Telecommunications Union; the H.323 Recommendation is hereby incorporated by reference in its entirety as if fully set forth herein.

An important key to the development of ToL and VoIP systems is the development of successful Quality of Service (QoS) IP networks. Generally, QoS refers to the ability of a network to guarantee specific performance levels, related to network bandwidth, availability, jitter, security, and data loss. High voice and/or video quality communication require high QoS levels on all network segments involved in the communication. Guaranteed QoS has been of particular concern on Ethernet LANs, both due to the bursty nature of IP traffic and the CSMA/CD contention protocol used by Ethernet.

Several approaches to QoS in IP networks have employed the Type of Service (TOS) byte, i.e., the second byte, in the IP header. The TOS field is an eight-bit field that signals to routers in the network a priority of handling as well as parameters related to delay, throughput, cost, and reliability. Because the TOS field itself had not been widely used, in certain implementations, it has been recast as a "differentiated service" (DS) byte, which is used to indicate to routers the per-hop behavior expected at the node. These approaches, however, do not in themselves provide a Quality of Service. Other protocols, such as the Resource Reservation Protocol (RSVP) or IEEE 802.1 p, are required to implement actual Quality of Service features. Even when the TOS/DS bits are used with such protocols, Quality of Service is not necessarily guaranteed network-wide.

As such, telephony vendors have been developing "Quality of Service Ethernet" (QoSEthernet), which lies between the IP layer and the Ethernet layer in the protocol stack and which provides a guaranteed QoS. Thus, FIG. 1B illustrates a protocol stack 100b including a QoSEthernet layer 115 between the IP layer 114 and the Ethernet layer 116. An exemplary QoSEthernet system is available from Path 1 Network Technologies, Inc., San Diego, Calif., and makes use of RSVP and the intserv process, described by the Internet Engineering Task Force (IETF).

In practice, implementation of the QoSEthernet layer 115 requires modified application programs 103b in order to provide the required QoSEthernet information at call setup. That is, each application program(s) 103b must be modified, or replaced, to provide one or more commands in addition to standard H.323 commands in order to invoke the required QoS. Thus, to support QoSEthernet, a user must not only implement a QoSEthernet layer but also change applications programs, such as telephone, fax, and the like. Further, each application program requires setup and configuration, which can cause added costs and delays in implementation.

As such, there is a need for a system to be able to implement QoSEthernet without having to replace existing software systems. There is a still further need for a system to implement QoSEthernet while using TOS bits to specify the required QoSEthernet Quality of Service.

SUMMARY OF THE INVENTION

These and other drawbacks in the prior art are overcome in large part by a system and method according to the present invention. According to one implementation of the present invention, existing software sets TOS bits during IP encapsulation. A Generate QoSEthernet layer receives the TOS bits and translates them into a form compatible with the QoSEthernet requirements. In a particular implementation, the Generate QoSEthernet layer is embodied in an H.323 Recommendation telecommunication system.

According to one implementation of the invention, one or more telephony application programs are provided, along with an H.323 Recommendation stack, an IP layer, and modular Generate QoSEthernet and QoSEthernet layers. Either the Generate QoSEthernet layer or the QoSEthernet layer may be replaced or modified without necessarily having to modify the H.323 Recommendation stack and application program(s).

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–7 illustrate an improved system and method for providing QoS in an Ethernet-type local area network. Existing software is used to generate TOS (Type of Service) values or DS (Differentiated Service) values when the data packets are encapsulated in the IP. A Generate QoSEthernet layer is provided that translates the TOS or DS bits into QoSEthernet-compatible commands. The QoSEthernet commands are then provided to a QoSEthernet layer.

Figure 2:
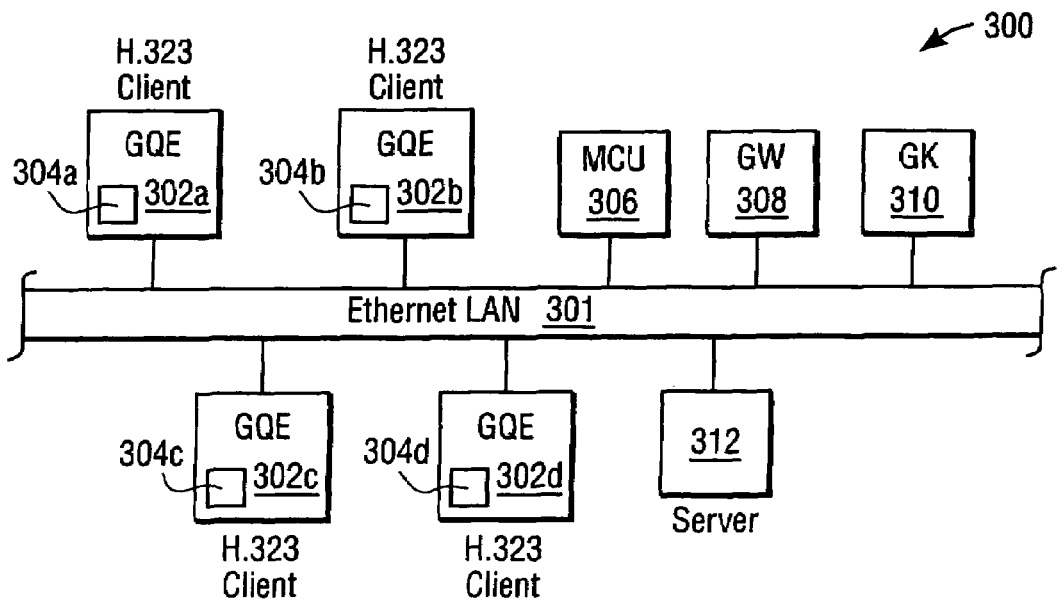
FIG. 2 is a diagram of an exemplary telecommunications system according to an implementation of the invention.

Turning now to the drawings, and with particular attention to FIG. 2, a diagram illustrating an exemplary IP protocol telecommunications system 300 according to an embodiment of the present invention is shown. In particular, the IP protocol communication system 300 may be embodied as an H.323 Recommendation-compatible system. It is noted that, while described herein with regard to an H.323 network, the invention is equally applicable to any network such as MGCP (Media Gateway Control Protocol), SIP+(Inter MGS Protocol), SGCP, MEGACO, and generally, any voice or multimedia over IP scheme. Further, it is noted that an exemplary generic H.323 system is the HiNet™ RC3000 system, available from Siemens.

The telecommunications system 300 includes a local area network (LAN) or packet network 301 and, particularly, and Ethernet LAN. Coupled to the LAN 301 may be a variety of H.323 terminals 302a–d, a multi-point control unit (MCU) 306, an H.323 gateway 308, an H.323 gatekeeper 310, a LAN server 312, and a plurality of other devices such as personal computers (not shown). The H.323 terminals 302a–d are in compliance with the H.323 Recommendation. Further, the H.323 terminals 302a–d include Generate QoSEthernet controllers or layers 304a–d, as will be described in greater detail below.

Figure 1A:
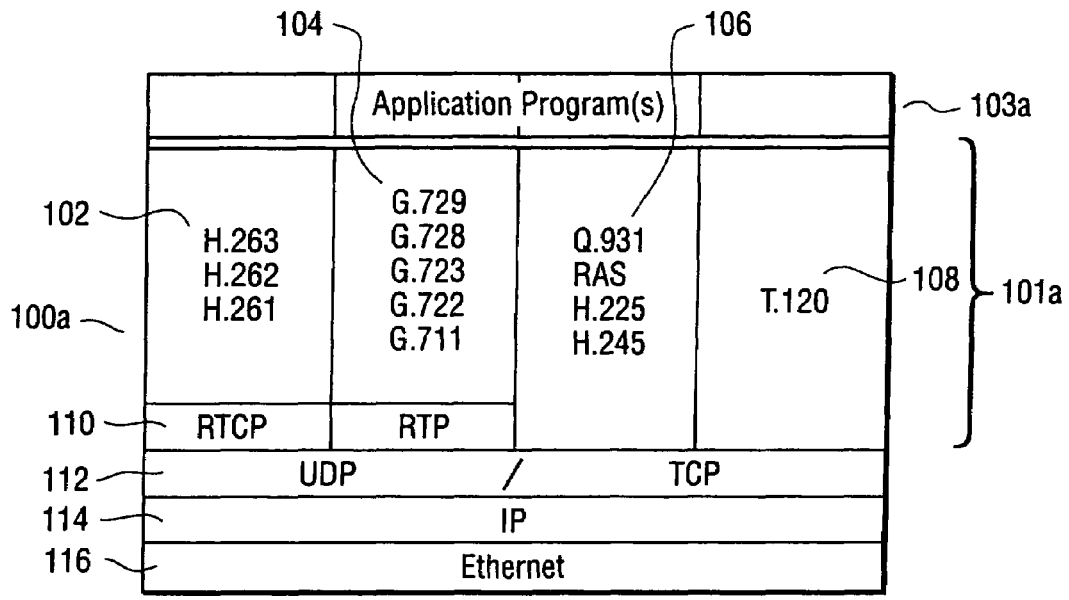
FIG. 1A and FIG. 1B illustrate exemplary program stacks according to the prior art.
Figure 1B:
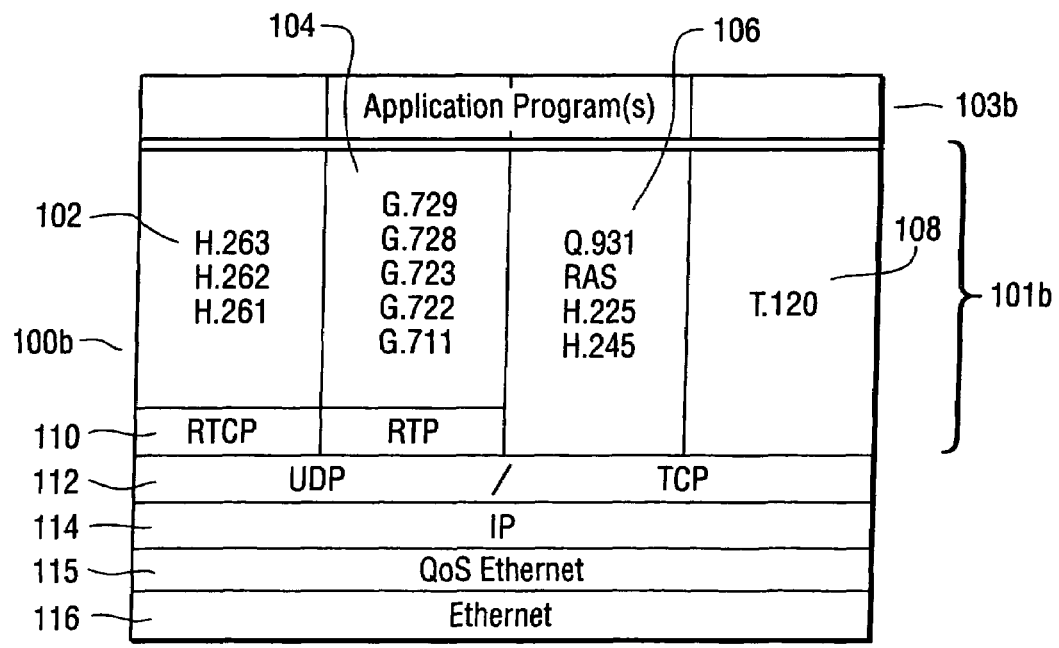
Figure 3:
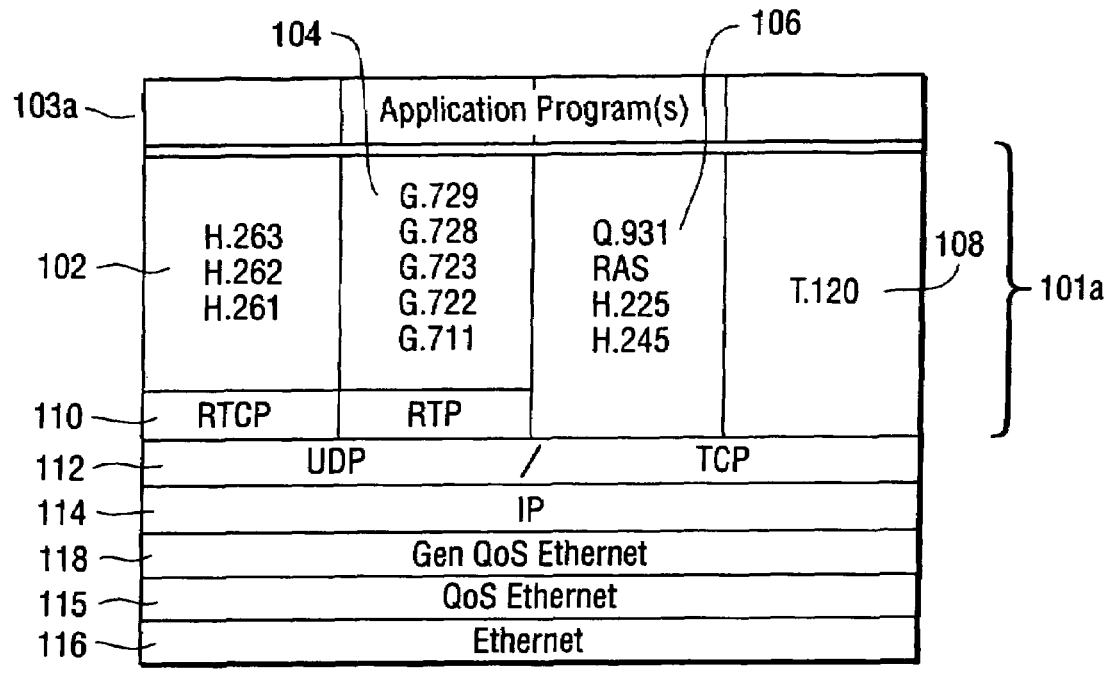
FIG. 3 is an exemplary program stack according to an implementation of the invention.

More particularly, FIG. 3 illustrates a protocol stack according to an implementation of the invention. At the top are one or more application programs 103a. The application programs 103a, similar to those of FIG. 1A, may be embodied as one or more telephony programs, such as fax, voice, video, and the like. Next is an Internet Protocol voice communication stack, such as an H.323 protocol stack 101a, similar to that of FIG. 1A. Thus, the H.323 stack includes video codecs 102; audio codecs 104; a control layer 106 supporting H.245 control signaling for negotiation of media channel usage, Q.931 (H.225.0) for call signaling and call setup, and H.225.0 Registration, Admission and Status (RAS); a data layer 108 supporting T.120 for data conferencing; and an RTP/RTCP layer 110. The Internet Protocol voice communication stack 101a lies atop a UDP/TCP layer 112 and an IP layer 114. The application programs 103a are adapted to generate commands which are encapsulated in the second byte of the IP header as type of service (TOS) or differentiated service (DS) bits.

Also included are a QoSEthernet layer 115 and an Ethernet layer 116. Further, a Generate QoSEthernet layer 118 according to the present invention is provided. As will be described in greater detail below, the Generate QoSEthernet layer 118 intercepts the second byte of the IP header, derives a required QoS therefrom, and generates the appropriate QoS commands for the QoSEthernet layer 115.

Figure 4:
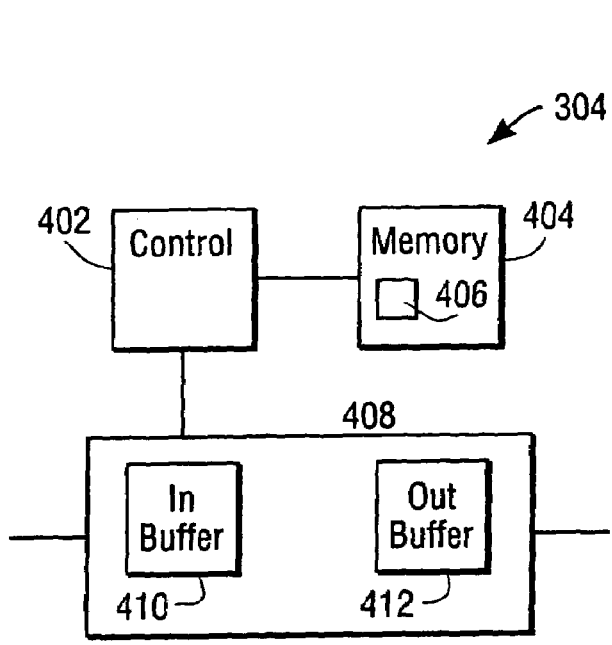
FIG. 4 is a diagram of an exemplary generate quality of service Ethernet module according to an implementation of the invention.

Turning now to FIG. 4, an exemplary Generate QoSEthernet module 304 is illustrated in greater detail. The Generate QoSEthernet module 304 includes a control unit 402 coupled to a memory 404. The memory 404 includes one or more lookup tables or databases 406 for storing conversions between TOS or DS bits and QoSEthernet commands, as will be explained in greater detail below. Also included is a buffer unit 408, including an input buffer 410 and an output buffer 412. The input buffer 410 receives the TOS or DS bits and buffers them during access of the lookup table 406. The TOS and DS bits are then transferred to the output buffer 412 and the appropriate QoS commands are generated. The commands are then output from the output buffer to the QoSEthernet.

Figure 5:
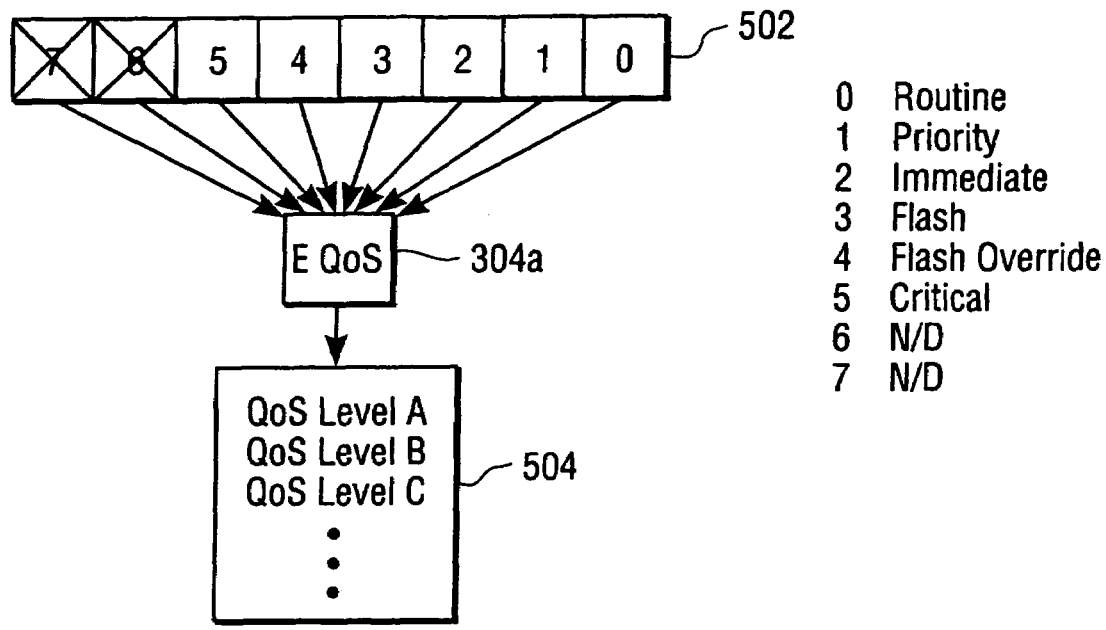
FIG. 5 illustrates exemplary mapping of type of service bits to QoS Ethernet QoS levels.

Turning now to FIG. 5, a diagram illustrating the principle of mapping of the TOS bits to QoS Ethernet commands is shown. FIG. 5 illustrates an exemplary TOS byte 502, a Generate QoS Ethernet map module 304a, and a QoS level mapped-to table 504. As is known, the first six bits of the Type of Service byte are used to define levels of service, ranging from "routine" to "critical." The Generate QoSEthernet layer 304a according to the present invention reads the defined TOS bits and maps them to corresponding QoS Ethernet QoS levels.

Figure 6:
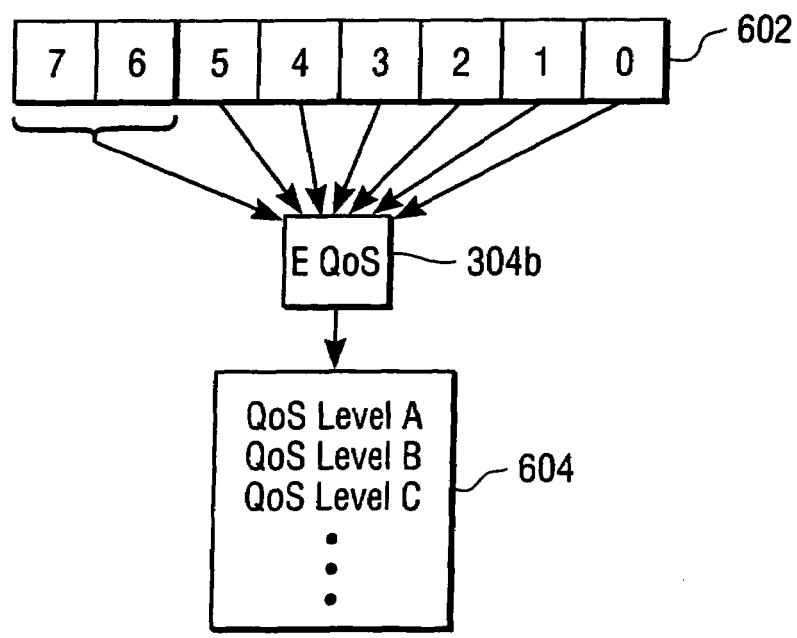
FIG. 6 illustrates exemplary mapping of differentiated service bits to QoS Ethernet QoS levels.

FIG. 6 is a similar diagram of the differentiated service byte mapping. Shown is a Differentiated Service byte 602, an exemplary Generate QoS Ethernet layer map 304b, and a resulting QoS level table 604. Bits 6–7 are presently unused; bits 0–5 are presently used to define "per hop behavior," i.e., a particular forwarding treatment at each node. The Generate QoS Ethernet layer 304b reads the DS byte 602 and maps the bits to a QoSEthernet quality of service level.

Figure 7:
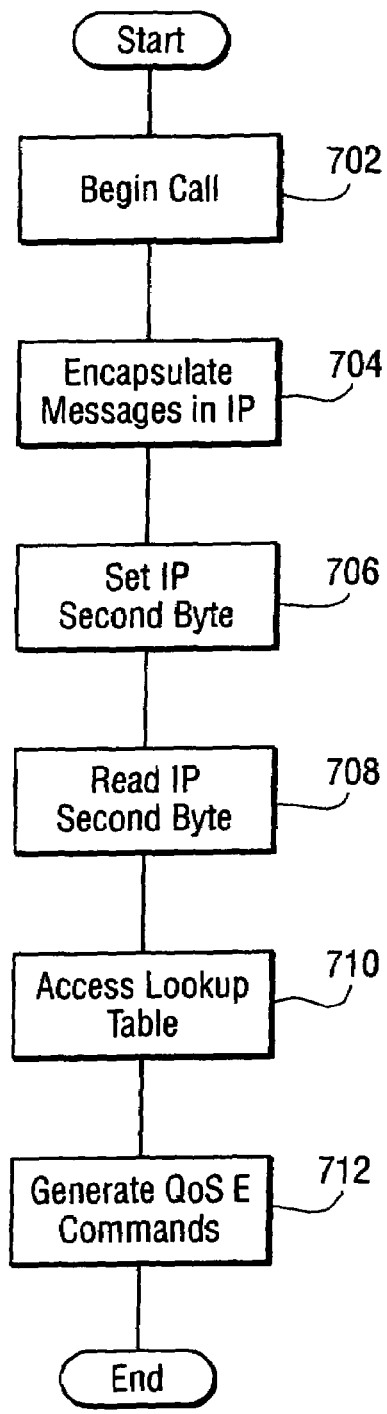
FIG. 7 is a flowchart illustrating operation of an implementation of the present invention.

Operation of an implementation of the present invention is illustrated more clearly with reference to the flowchart of FIG. 7. In a step 702, the client terminal begins a call. In a step 704, the corresponding messages are encapsulated in IP packets. In a step 706, the second byte of the IP header is set according to predefined QoS levels. As discussed above, the second byte may be either a Type of Service byte or a Differentiated Service byte. In a step 708, the second byte of the IP header is read by the Generate QoS Ethernet layer. In a step 710, the Generate QoSEthernet layer accesses the lookup table in memory for the corresponding QoSEthernet levels. Finally, in a step 712, the Generate QoSEthernet layer generates the required QoS Ethernet commands to establish the specified quality of service.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
   an Ethernet-type local area network; and
   one or more telecommunications devices coupled to said Ethernet-type local area network, said one or more telecommunications devices including:
   an Internet Protocol (IP) voice communication stack;
   a quality of service Ethernet layer; and
   a generate quality of service Ethernet layer interposed between said Internet Protocol voice communication stack and said quality of service Ethernet layer and adapted to intercept a second byte in an IP header of an IP layer, identify from said second byte a quality of service required for individual calls, and generate corresponding quality of service commands to said quality of service Ethernet layer to define an Ethernet quality of service at an Ethernet layer;
   said second byte comprising a type of service byte;

wherein said quality of service Ethernet layer and said generate quality of service Ethernet layer are modular.

2. A telecommunications system, comprising:
an Ethernet-type local area network; and
one or more telecommunications devices coupled to said Ethernet-type local area network, said one or more telecommunications devices including:
an Internet Protocol (IP) voice communication stack;
a quality of service Ethernet layer; and
a generate quality of service Ethernet layer interposed between said Internet Protocol voice communication stack and said quality of service Ethernet layer and adapted to intercept a second byte in an IP header of an IP layer, identify from said second byte a quality of service required for individual calls, and generate corresponding quality of service commands to said quality of service Ethernet layer to define an Ethernet quality of service at an Ethernet layer;
said second byte comprising a differentiated service byte;
wherein said quality of service Ethernet layer and said generate quality of service Ethernet layer are modular.

3. A telecommunications device adapted to be coupled to an Ethernet-type local area network, comprising:
an Internet Protocol (IP) voice communication stack;
a quality of service Ethernet layer; and
a generate quality of service Ethernet layer interposed between said Internet Protocol voice communication stack and said quality of service Ethernet layer and adapted to intercept a second byte in an IP header of an IP layer, identify from said second byte a quality of service required for individual calls, and generate corresponding quality of service commands to said quality of service Ethernet layer to define an Ethernet quality of service at an Ethernet layer;
said second byte comprising a type of service byte;
wherein said quality of service Ethernet layer and said generate quality of service Ethernet layer are modular.

4. A telecommunications device adapted to be coupled to an Ethernet-type local area network, comprising:
an Internet Protocol (IP) voice communication stack;
a Quality of Service (QoS) Ethernet layer; and
a generate quality of service Ethernet layer interposed between said Internet Protocol voice communication stack and said QoS Ethernet layer and adapted to intercept a second byte in an IP header of an IP layer, identify from said second byte a quality of service required for individual calls, and generate corresponding QoS commands to said QoS Ethernet layer to define an Ethernet quality of service at an Ethernet layer;
said second byte comprising a differentiated service byte;
wherein said QoS Ethernet layer and said generate quality of service Ethernet layer are modular.

5. A method comprising:
intercepting a second byte from an Internet Protocol (IP) header from an IP layer at a generate quality of service layer interposed between said IP layer and a Quality of Service (QoS) Ethernet layer;
identifying from said second byte a quality of service required for individual calls; and
generating corresponding QoS commands to said QoS Ethernet layer to define an Ethernet quality of service at an Ethernet layer;
wherein said QoS Ethernet layer is modular and wherein said QoS commands are generated at a modular generate quality of service Ethernet layer, wherein said second byte comprises a type of service byte or a differentiated service byte.

6. A method, comprising:
beginning an IP multimedia call;
encapsulating corresponding messages for said IP multimedia call in IP protocol data packets;
setting a second byte of an IP header at an IP layer for said IP protocol data packets;
reading said second byte at a generate quality of service layer interposed between said IP layer and a Quality of Service (QoS) Ethernet layer before said IP protocol data packets are sent over a network;
accessing a lookup table, said lookup table containing entries for mapping said second byte to QoS Ethernet quality of service commands;
sending said QoS Ethernet quality of service commands to a QoS Ethernet layer; and
sending said IP protocol data packets over an Ethernet network using a quality of service as specified in said QoS Ethernet quality of service commands at an Ethernet layer;
wherein said QoS Ethernet layer is modular and wherein said QoS commands are mapped using a modular generate quality of service Ethernet layer.

7. The method according to claim 6, wherein said second byte comprises a type of service byte.

8. The method according to claim 6, said second byte comprising a differentiated service byte.

9. A system, comprising:
means for beginning an IP multimedia call;
means for encapsulating corresponding messages for said IP multimedia call in IP protocol data packets;
means for setting a second byte of an IP header at an IP layer for said IP protocol data packets;
means for reading said second byte at a generate quality of service layer interposed between said IP layer and a Quality of Service (QoS) Ethernet layer before said IP protocol data packets are sent over a network;
means for accessing a lookup table, said lookup table containing entries for mapping said second byte to QoS Ethernet quality of service commands;
means for sending said QoS Ethernet quality of service commands to a QoS Ethernet layer; and
means for sending said IP protocol data packets over an Ethernet network using a quality of service as specified in said QoS Ethernet quality of service commands at an Ethernet layer;
wherein said QoS Ethernet layer is modular and wherein said QoS commands are mapped using a modular generate quality of service Ethernet layer.

10. The system according to claim 9, wherein said second byte comprises a type of service byte.

11. The system according to claim 9, said second byte comprising a differentiated service byte.

* * * * *